Nov. 9, 1965   J. W. G. KERSHAW   3,216,437
SHAFT ROTATION SENSING DEVICE
Filed Sept. 6, 1961
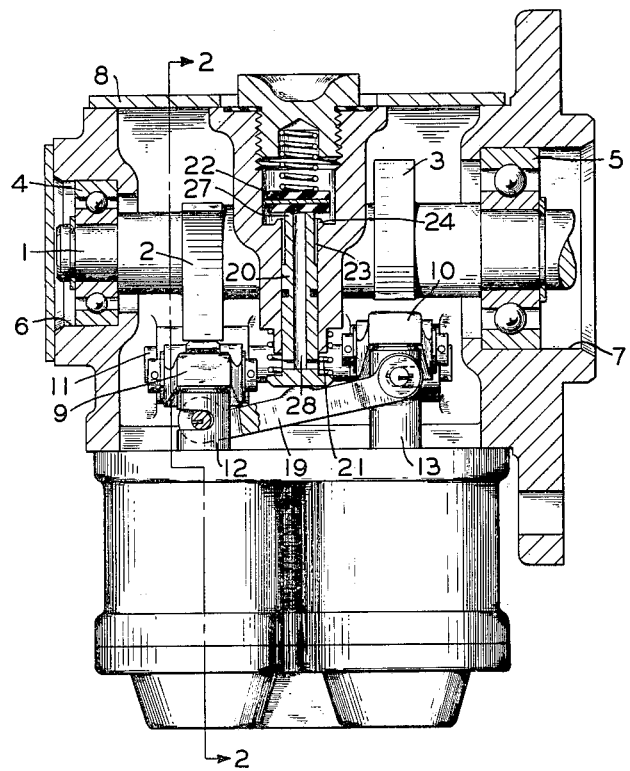
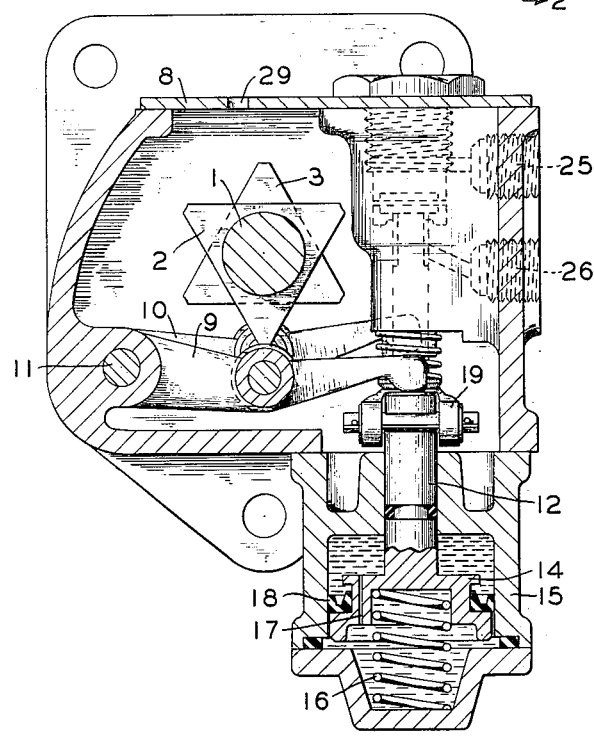
INVENTOR.
JOHN W. G. KERSHAW
BY
*A. A. Steinmiller*
ATTORNEY

3,216,437
SHAFT ROTATION SENSING DEVICE
John W. G. Kershaw, London, England, assignor to Westinghouse Brake & Signal Company, Ltd., London England
Filed Sept. 6, 1961, Ser. No. 136,331
Claims priority, application Great Britain, Nov. 16, 1960, 39,299/60
5 Claims. (Cl. 137—50)

This invention relates to a shaft rotation sensing device or detector and, more particularly, to such a device operable responsively to the rotation of a shaft above or below a certain low rate for controlling supply, cutoff and venting of fluid under pressure to a mechanism to be controlled, or for effecting operation of an electrical switch for controlling an electrical circuit.

Certain of the presently known shaft rotation sensing devices are of the fluid pressure operable type, that is, they first must be supplied with fluid pressure before they respond to the rotating or non-rotating state of a shaft to occupy a position accordingly, said supply being continuous while the device is in operation. Characteristically, however, once this type of device has been actuated, in response to fluid pressure, to a position indicating the shaft to be rotating, the device does not automatically change position to indicate if the shaft has stopped rotating as long as the actuating fluid pressure continues. A non-rotating condition of the shaft may then be detected only if the actuating fluid pressure is first cut off and then restored, whereupon the device will assume a position indicating a non-rotating shaft. In addition, certain of the presently known detectors are not readily adaptable for operating electrical switch means for controlling electrical circuits.

It is the object of this invention, therefore, to provide a shaft rotation sensing device which is operative to indicate whether a shaft is rotating or is not rotating above a predetermined speed, nothwithstanding a continuous supply of fluid under pressure thereto, and which is adaptable to control either a fluid pressure supply system or an electrical control circuit. Briefly, the invention comprises a rotatable shaft or element, valve means operable responsively to the rotation of the shaft either to effect supply or cutoff and venting of fluid under pressure, depending upon whether the shaft is rotating above or below a predetermined rate of rotation, and cam elements rotatable with said shaft for effecting operation of said valve means (or electrical switch means, if desired) in accordance with the state of rotation of the shaft.

In the accompanying drawing FIG. 1 is an elevational view, partly in section, of a shaft rotation sensing device embodying the invention, and FIG. 2 is a sectional view of the device taken along line 2—2 of FIG. 1 in the direction indicated by the arrows.

In accordance with the invention, a shaft rotation sensing device, as shown, comprises a shaft 1 driven, for example, by a vehicle axle (not shown), the rotative state of which shaft it is desirable to ascertain. The shaft 1 is provided with axially spaced cams 2 and 3 integrally formed therewith, said cams each being substantially triangularly shaped and each having a corresponding number of high points or lobes, the lobes of one cam being angularly staggered relatively to the lobes of the other. The shaft 1 is mounted at each end in respective bearings 4 and 5 disposed in respective recesses 6 and 7 formed in the upper portion, as viewed in the drawing, of a casing 8 for housing the sensing device. The cams 2 and 3 engage the intermediate portions of two levers 9 and 10, respectively, which are pivotally mounted at corresponding ends thereof on a shaft 11 in perpendicular relationship thereto and axially spaced thereon. The ends of levers 9 and 10 remote from shaft 11 operatively engage the heads of two piston stems 12 and 13, respectively, so that upon rotation of shaft 1, the staggered cams 2 and 3 intermittently and alternately depress the respective levers 9 and 10 which in turn depress the respective stems 12 and 13.

Each stem 12 and 13 has a damper piston 14 (one of which is shown in FIG. 2) integrally formed therewith which is reciprocally operable in a liquid-filled cylinder 15 and is urged upwardly, as viewed in the drawing, by a spring 16. A restricted passage 17 connects the upper and lower faces of the damper piston 14 so that movement thereof forces liquid from one side of the piston to the other through the passage. Ample clearance between the peripheral surface of the piston 14 and the cylinder wall along with a packing cup type check valve 18 permits free flow of liquid past said piston and check valve during downward movement of said piston, whereas, due to the action of said check valve, flow of liquid during upward movement of said piston is restricted through the passage 17 only. The upper ends of the stems 12 and 13 are interconnected by a rocking lever or link member 19, the intermediate portion of which engages the base of a valve stem 20 which is urged into engagement with said rocking lever by a spring 21. Movement of the valve stem 20 operates a valve 22 which connects a chamber 23 either to a source of fluid under pressure (not shown) or to atmosphere.

In operation, rotation of the shaft 1 causes the cams 2 and 3 to alternately depress stems 12 and 13 through action of said cams on the respective levers 9 and 10. Movement of piston stems 12 and 13 and the length of valve stem 20 are so arranged that when one of said piston stems is in its uppermost position and the other is in its lowermost position, the valve 22 occupies an unseated or supply position with respect to a valve seat 24 to connect chamber 23 to the source of fluid under pressure via a supply communication comprising a port 25 and thereby effects supply of fluid pressure to a device (not shown) to be controlled via a delivery communication comprising a port 26 open to said chamber. As each piston stem is depressed, the liquid in the respective cylinder 15 is forced rapidly from the lower side of the respective damper piston 14 to the upper side thereof past the piston and the check valve 18, and when the cam ceases to act on the respective lever 9 or 10, the piston and its associated stem is returned upwardly by the spring 16 so that liquid is forced from the upper side to the lower side of the piston through the restricted passage 17 only.

It can thus be seen when the shaft 1 is rotating at a rate in excess of a certain critical rate, one of the cams 2 and 3 will lose contact with the respective lever 9 or 10 before the respective piston stem 12 or 13 has had sufficient time to return to the limit of its uppermost position due to the delay imposed thereon by the restricted flow of liquid through passage 17 and, therefore, the other piston stem will be depressed by the respective lever acting thereon during upward movement of the first piston stem. Thus, with the shaft 1 rotating in excess of the critical rate and, therefore, the pistons 14 reciprocating at a corresponding rate, said pistons do not have sufficient time in each cycle of reciprocation to return to their uppermost positions and are therefore maintained somewhere between their uppermost position and lowermost position or what may be called an intermediate position. This results in the rocking lever 19 being displaced downwardly from the position shown in the drawing, so that spring 21 causes valve stem 20 to move downwardly with said rocking lever until valve 22 occupies a seated or cut-off position on valve seat 24, in which position of said valve the chamber 23 is cut off from the source of fluid under pressure. Further downward movement of valve stem 20 results in unseating of a valve seat 27, formed on the end of said valve stem remote from rocking lever 19, from the valve 22 to permit venting of the device to be controlled via a venting communication comprising port 26, chamber 23, a passage 28 formed in said valve stem and a vent port 29 formed in casing 8.

The rate of rotation of shaft 1 at which both piston stems 12 and 13 remain in their respective downward positions is determined by the size of passage 17 and the compression value of spring 16. In some instances this critical rate of rotation of shaft 1 and therefore of the vehicle axle with which it is associated is found to correspond to a vehicle speed of approximately two m.p.h., for example, so that if the speed of the vehicle exceeds the critical speed of two m.p.h., valve 22 remains seated on valve seat 24 while chamber 23 is vented to atmosphere via passage 28, as above described.

It should be apparent that in whatever position the shaft 1 is stopped, one of the cams 2 and 3 will be disengaged from the respective lever 9 or 10, and thus the respective piston stem 12 or 13 associated therewith will be in its uppermost position to cause valve 22 to be unseated from valve seat 24 and thereby effect supply of fluid under pressure to chamber 23 and thus to the device to be controlled.

It should also be understood that, although the invention as above described is associated with a valve mechanism which effects venting of a chamber to atmosphere when the shaft 1 is rotating in excess of a critical speed and effects supply of fluid under pressure to said chamber when said shaft is rotating below said critical speed, the invention could readily be arranged to effect the functions of said valve mechanism in a manner inverse to that described.

And finally, it should also be understood that the lever 19 could readily be adapted to open or close the contacts of an electrical switch device in the event it would be desired to control an electrical device instead of a fluid pressure responsive device.

Having now described the invention, what I claim as new and desire to secure by Letters Patent is:

1. A shaft rotation sensing device comprising a casing having a driven shaft rotatably mounted therein, a pair of axially spaced cam members fixed on said shaft, each cam member having a plurality of equi-angularly spaced cam lobes and the cam lobes of the respective cam members being staggered with respect to each other, a pair of parallel-arranged cylinders having piston members operative therein, means for inhibiting movement of said piston members in their respective cylinders in one direction, lever means for each cam member being engaged by said cam lobes and thereby effective to move a corresponding one of the piston members in its cylinder to a first position in a direction opposite to said one direction, biasing means for each piston member effective to return the piston member, in said one direction against the force of said movement inhibiting means, to a second position upon disengagement of a lever means by a cam lobe, a link member pivotally connected at its opposite ends to said piston members, and control means operatively positioned according to the position of said link member.

2. A shaft rotation sensing device for use in controlling operation of a mechanism to be controlled according to the state of rotation of a shaft, said device comprising, in combination, a rotatably mounted shaft, valve means operable to one position, in which a supply communication is open via which operating fluid pressure may be supplied to the mechanism, and being operable to a cut-off position in which said supply communication is closed and a venting communication is established via which fluid pressure is vented from the mechanism, a pair of pistons disposed in axially parallel relation to each other and each being reciprocably operable between an uppermost and lowermost position in alternating phases relatively to each other, said pistons each having a piston stem extending coaxially from corresponding sides of the respective pistons, a rocking lever interconnecting the free ends of said piston stems and having its mid-point engaging said valve means for effecting operation thereof to its said one position when one of said pistons is in its said uppermost position and the other piston is in its said lowermost position, respective dampening means associated with each of said pistons for reducing the rate of upward movement of each piston from its lowermost position to its uppermost position as related to the rate of downward movement of said pistons in the opposite direction, a pair of operating levers each being pivotally anchored at one end and having their other ends operatively engaging the respective free ends of said piston stems, said operating levers being alternately pivotable in one direction for effecting alternating downward movement of said pistons, respectively, respective biasing means associated with each of said pistons for effecting said upward movement of said pistons and reverse pivotal movement of said operating levers, and a pair of cams axially spaced on and rotatable with said shaft and each having an equal number of lobes equi-angularly and peripherally spaced thereon, the lobes of one cam being angularly staggered relatively to the lobes of the other cam, the lobes of said cams being respectively engageable with said operating levers for effecting alternating pivotal movement of said operating levers in their said one direction upon rotation of said shaft, the rate of said alternating pivotal movement depending upon the rate of rotation of said shaft, said dampening means being effective, upon rotation of said shaft at a rate in excess of a certain rate, for sufficiently reducing the rate of said upward movement of said pistons to prevent said pistons from reaching their respective uppermost positions and to limit the respective upward movement of said pistons to an intermediate position in which said rocking lever effects operation of said valve means to its said cut-off position.

3. A shaft rotation sensing device as defined in claim 2 and further characterized in that the number of lobes on each of said cams and the arrangement thereon are such that when said shaft is in a non-rotating state, one of said operating levers is engaged by a lobe of the respective cam while the other operating lever is not, whereby the pistons occupy their lowermost and uppermost positions, respectively, to insure retention of the valve means in its said supply position so long as said shaft is in said non-rotating state.

4. A shaft rotation sensing device for use in controlling operation of a mechanism to be controlled according to the state of rotation of a shaft, said device comprising, in combination, a rotatably mounted shaft, valve means having one position in which a supply communication is open via which operating fluid pressure may be supplied to the mechanism, and being operable to a different position in which said supply communication is closed and a venting communciation is established via which fluid pressure may be dissipated from the mechanism, a pair of pistons reciprocably operable within certain limits of travel, lever means for operating said pistons, cam means carried by and rotatable with said shaft and operatively engageable with said lever means for causing said lever means to effect alternate operation of said pair of pistons in one direction, biasing means for returning said pistons in the opposite direction, dampening means for delaying the rate of movement of said pistons in the said opposite direction, and means controlled jointly by the relative positions of said pistons during rotation of said shaft below a certain rate for effecting operation of said valve means to its said one position and during rotation of said shaft above said certain rate for effecting operation of said valve means to its said different position.

5. A shaft rotation sensing device as defined in claim 4 wherein said cam means comprises a pair of cams axially spaced on and rotatable with said shaft and each having an equal number of lobes, the lobes of one cam being angularly staggered relatively to the lobes of the other cam, and said lever means comprises a pair of levers each pivotally anchored at one end and having the other end operatively engaged with the corresponding said piston, said levers being operatively engaged by said cams, respectively, for effecting operation of said pistons upon rotation of said shaft and said cams.

References Cited by the Examiner
UNITED STATES PATENTS

| | | | |
|---|---|---|---|
| 967,963 | 8/10 | Onsrud | 73—551 X |
| 2,681,221 | 6/54 | Randol | 73—523 X |

ISADOR WEIL, *Primary Examiner.*